United States Patent [19]

Siccardi

[11] 4,278,423

[45] Jul. 14, 1981

[54] HEATING AND VENTILATING SYSTEM FOR POULTRY HOUSES

[76] Inventor: Frank J. Siccardi, 2850 Inwood La., Fayetteville, Ark. 72701

[21] Appl. No.: 97,612

[22] Filed: Nov. 27, 1979

[51] Int. Cl.³ .......................... F24H 1/00; F27B 9/14
[52] U.S. Cl. ...................................... 432/222; 432/37
[58] Field of Search ................................. 432/222, 37

[56] References Cited

U.S. PATENT DOCUMENTS

| 3,398,940 | 8/1968 | Kosarin | 432/222 |
| 3,591,150 | 7/1971 | Weatherston | 432/222 |
| 3,998,581 | 12/1976 | Hemingway et al. | 432/222 |

*Primary Examiner*—John J. Camby
*Attorney, Agent, or Firm*—Robert R. Keegan

[57] ABSTRACT

A heating-ventilating system including an air duct adapted to be installed in an exterior wall of a poultry house and having a fan mounted near the interior end of the duct and a fuel burner mounted in the duct upstream from said fan, the fuel burner being adapted to burn fuel efficiently in the high velocity air flow provided by the fan; an igniter including an electric spark generator for igniting the burner in response to an electrical signal, a first stage fuel control valve and a second stage fuel control valve with the main fuel control valve responding to a flame sensor and to a thermostat in the interior of the poultry house and the second stage fuel control valve responding to a second independent thermostat; a control for the fan which operates the fan alone in response to a warmer than desired temperature in the poultry house, which causes the fan to turn off at a desired temperature range in the poultry house, and which causes the fan to operate in conjunction with the fuel burner for lower than desired temperatures.

8 Claims, 7 Drawing Figures

HEATING AND VENTILATING SYSTEM FOR POULTRY HOUSES

This invention relates to heating systems for poultry houses and in particular a heating-ventilating system which also provides introduction of fresh air into the poultry house, circulation of air within the poultry house and exfiltration (outward percolation) of air from the poultry house in a manner to provide optimum environmental conditions for the birds while making the maximum use of animal body heat in maintaining the desired poultry house temperature. The heating-ventilating system according to the present invention is intended for use in the cool and cold months of the year and is not expected to be useful for cooling poultry houses in summer months; conventional ventilating systems or the use of natural ventilation would be utilized during the season when extensive cooling would be required. It is also contemplated that the usual temperature warning alarms would be employed in conjunction with the heating-ventilating system of the invention.

A conventional poultry house structure is a long narrow structure about 35 feet wide and from about 250 to 600 feet long with screened openings along each side which can be closed with curtains or may be opened to increase ventilation. Customarily when heating of the poultry house was required the curtains would be closed and brooder stoves throughout the chicken house burning natural gas or LP gas provided added heat. A great deal of added heat may be required at the beginning of the growth cycle and as the birds gain body weight the heat provided by bird body heat provides most or all of the heat required to maintain the desired temperature in the house. The litter in the house is a source of heat which also increases through the course of the growing cycle.

In accordance with the present invention the number of brooder stoves is greatly reduced. Brooder stoves will be required only in a portion of the poultry house which is utilized in the beginning of the cycle. This portion of the house is closed off with a curtain during the initial weeks of the growing cycle. This technique is known as "partial house brooding" and the heating-ventilating system of the invention is particularly adapted to this technique.

There is normally one heating-ventilating unit in each poultry house, preferably at one end utilized for partial house brooding. In the partial house brooding portion of the cycle the brooder stoves are utilized but they are supplemented by the action of the heating-ventilating system, which circulates the air and prevents formation of a cold air zone near the floor. This also avoids much hotter air collecting at the ceiling, decreasing heat losses to the building exterior. The heating-ventilating system also adds heat to the air drawn from the exterior as required.

According to the partial house brooding technique the birds are given access to a greater portion of the house and eventually to the entire poultry house as their body weight increases. The heating-ventilating system of the invention continues to operate in essentially the same manner except that heat from brooder stoves plays a less significant part and heat provided by bird body heat becomes more significant. The fan produces circulation of the air mass in the poultry house which is enhanced by the convection currents produced by animal body heat. The system provides for re-circulation of air as well as introduction of exterior air. The introduction of exterior air produces a very slight positive pressure in the poultry house which prevents infiltration of outside air through crevices, gaps around curtains, etc.

By reversing the previously common infiltration situation the walls of the poultry house are kept much warmer and condensation on curtains, poultry house walls, and ceilings is substantially reduced. The overall moisture level in the house is also reduced due to the capacity of the warmed injected air for absorbing moisture which is removed from the house with exfiltration of the air. Substantially less ammonia is produced from the litter due to reduced moisture content (about 25% moisture).

The burner-fan unit is preferably constructed in the form of a cylindrical duct which is placed in an opening in the poultry house side wall. The interior end of the duct has a fan mounted therein which may be from about 24 inches to 30 inches in diameter. An open flame fuel burner is placed near the other end of the duct and heats the air passing through the duct directly without the necessity for a heat exchanger, thus greatly simplifying the construction and reducing the cost of the unit. The burner is designed to operate in the fan air flow to produce highly efficient combustion and the products of combustion are essentially water vapor and carbon dioxide and are nonpolluting. The burner is preferably supplied with an electronic ignition system so that there is no necessity for a sustained pilot flame which would be wasteful of energy. An important part of the system is the control system which operates the fan, ignites the burner, supplies fuel to the main burner in two stages all in a manner to properly control the environment in the poultry house as will be better explained in detail below.

The present invention differs from prior poultry house heating and ventilating systems in that it heavily relies upon circulation of air and introduction of heated outside air to produce the desired environment. Open flame air heating units are in themselves known, of course, and have been used for agricultural purposes such as grain drying, but such heaters are not known to have been employed for poultry house environmental control in the manner described and claimed herein.

In addition to providing the above-described features and advantages it is an object of the present invention to provide an air injector, circulator, and heater for a poultry house automatically controlled by temperature conditions and adjustable for climatic conditions to provide an optimum environment for birds in a poultry house during cold weather months.

It is another object of the present invention to provide a thermostatically controlled ducted fan open flame heating-ventilating unit for a poultry house which is of simple and inexpensive construction and provides reliable, relatively maintenance-free operation.

It is still another object of the present invention to provide a poultry house environment during cold weather months wherein a portion of the poultry house, or the entire poultry house, is periodically provided with circulating air replenished from outside which is heated or temperature moderated by a combined heating-ventilating unit.

Other objects and advantages of the invention will be apparent from consideration of the following description in conjunction with the appended drawings in which.

Figure 1:
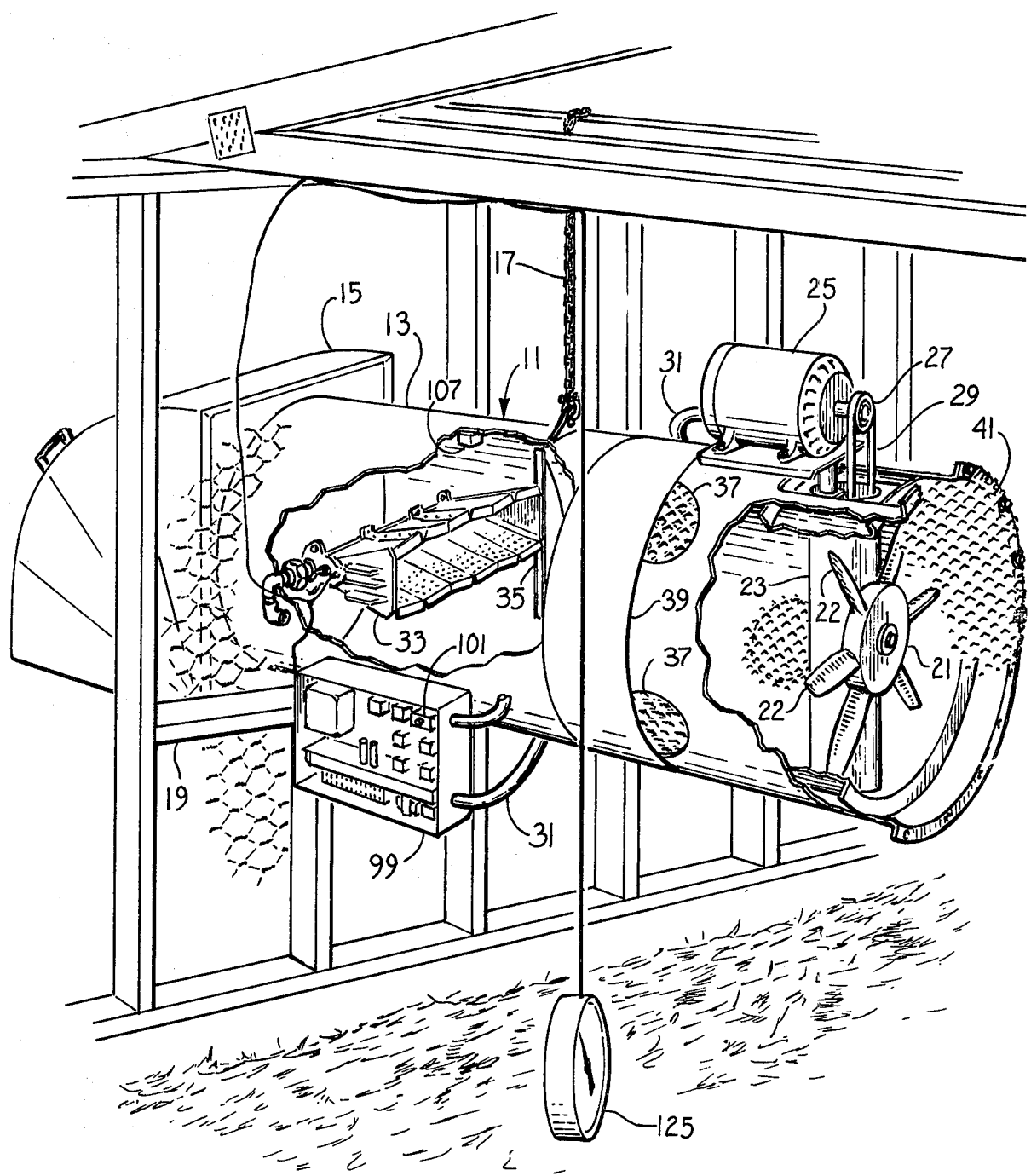
FIG. 1 is a perspective view partially broken away of a heating-ventilating unit according to the present invention.

FIG. 1 shows a heating-ventilating unit 11 as it would be installed in a poultry house. The unit 11 includes a cylindrical steel duct 13 having a weather hood 15 secured to the outer end thereof. The unit 11 is preferably mounted several feet above the floor and may be supported in any suitable fashion such as by cable 17 attaching to a rafter of the chicken house. The duct 13 may also be secured to the frame 19 of the opening in the chicken house through which it projects.

Near the interior end of duct 13 there is mounted a bladed fan 21 which has blades 22 of a diameter only slightly less than the inside diameter of duct 13 thus producing an efficient ducted fan blower arrangement. Fan 21 serves to mix the air to produce a uniform air temperature as well as accelerating the air. Fan 21 is mounted on a cylindrical column 23 and is driven by fan motor 25 through a pulley and a belt 29 as will be more fully described with reference to FIG. 6.

An electrical control box 99 is secured to duct 13. Power cable 31 for motor 25 runs to control box 99 which is connected to power cables, usually of 230 volts, and contains relays, fuses and other electrical components later to be described. An on-off switch 101 is provided on control box 99 while other components and controls are located in the interior of control box 99. The electrical components and the electrical connections of control box 99 will be explained with respect to the electrical schematic block diagram of FIG. 7.

Duct 13 is broken away to show the interior which contains air heater 33 mounted between support plates 35 (only one of which is shown). Support plates 35 also serve as baffles to direct the air flow through the central portion of the duct 13 occupied by the air heater 33.

Figure 5:
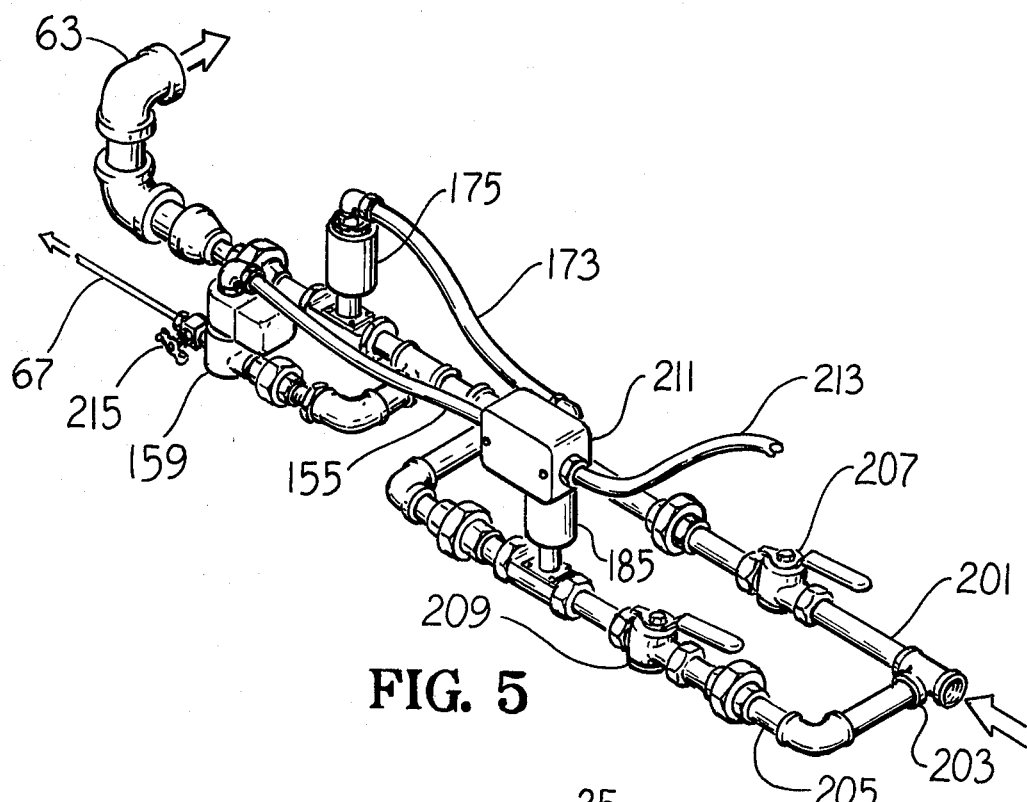
FIG. 5 is a perspective view of the pipes and control valves associated with the burner shown in FIG. 3.

Air heater 33 operates from natural gas or LP gas, the valves and connections for which are not shown in FIG. 1 but are shown in detail in FIG. 5.

Figure 2:
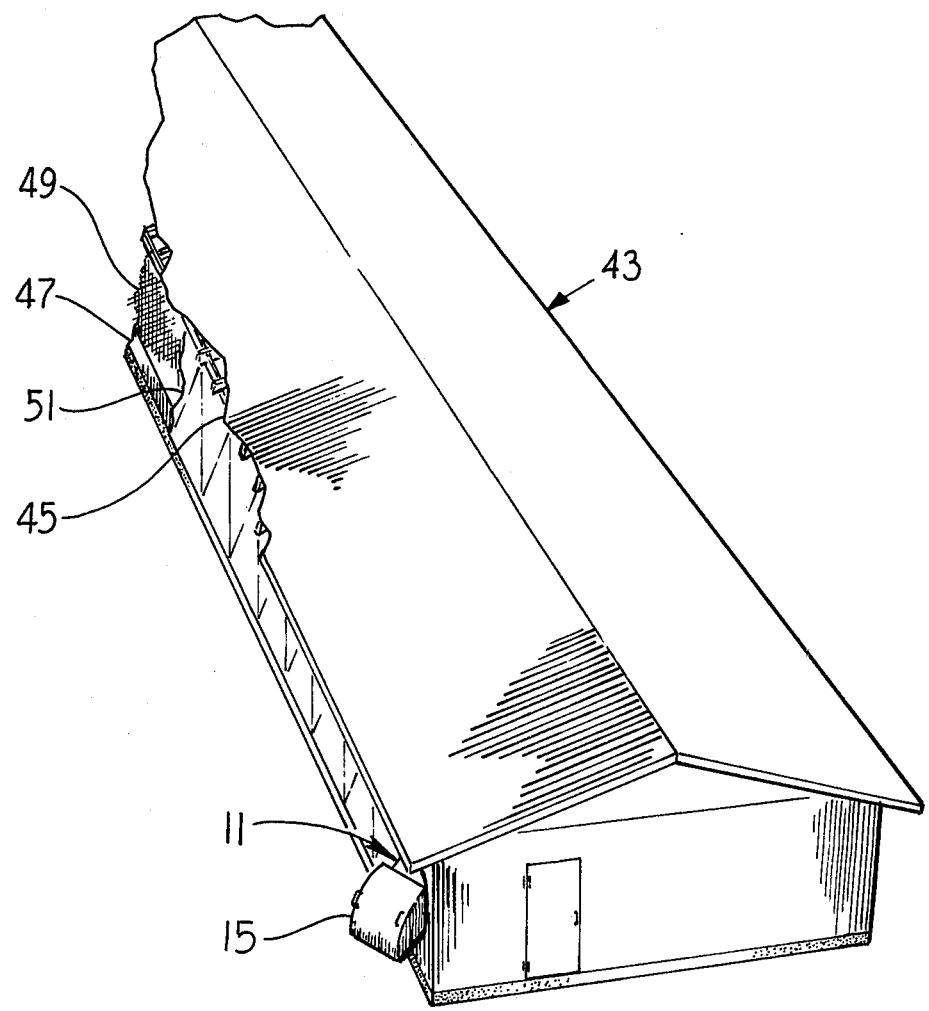
FIG. 2 is a perspective fragmentary view of a poultry house showing the placement of the heating-ventilating unit of FIG. 1 in the poultry house.

FIG. 2 shows an example of installation of the heating and ventilating unit in a poultry house 43. The poultry house 43 is customarily from 200 to 600 feet long and approximately 35 feet wide. The end having the heating-ventilating unit installed therein is shown with roof 45 broken away in FIG. 2. It may be noted that the heating-ventilating unit 11 is installed near the end of the poultry house 43 and is mounted at an angle to direct air from the blower toward the opposite end of the poultry house. It has been found that the circulation of air by the heater-ventilator unit arranged as shown in FIG. 2 is enhanced by convection currents created by the body heat of the birds so that circulation is achieved in houses up to 600 feet in length with a single heater-ventilator unit 11. There is, of course, no reason why more than one unit in the same location could not be placed in a poultry house and controlled from the same or from a different control circuit; such additional equipment and expense is not usually necessary or justified.

It is desired that the unit 11 be placed near one end of the poultry house to facilitate the partial house brooding technique previously mentioned. In this technique a limited portion of the poultry house such as 30–50% of its length is screened off when first starting the birds through the growing cycle. Only this portion of the house is provided with brooder stoves in the utilization of the heating and ventilating system according to the invention. When the birds attain a greater body weight they will produce more body heat so that the brooder stoves will normally not be necessary and at the same time the birds will require a greater area to avoid overcrowding. At this point a large portion or the entire poultry house will be utilized by moving the interior curtain wall.

As may be observed from FIG. 2 the normal poultry house construction employs a large open area covered by screen along each side of the poultry house so that maximum use of natural ventilation can be obtained in summer months. The screened side openings 49 are covered by curtains 51, either wholly or partially, to control the amount of ventilation. In the most severely cold weather the curtains 51 will be completely closed to minimize loss of heat to the exterior of the house. When the curtains are closed they are still far from air tight, and it is an important advantage of the system of the invention that a moderate excess pressure is developed in the poultry house so that infiltration of air through the walls and curtains of the poultry house is minimized and on the contrary some air flow is forced from the interior to the exterior of the house. This keeps the walls and ceilings of the poultry house warmer than in the prior conventional heating systems and also it eliminates heavy condensation on walls and curtains which presented problems in past arrangements.

In the present system the air heated by the heating-ventilating system is capable of picking up moisture generated within the house and tends to carry it out of the house without condensing on curtains, walls or ceilings. The health of the chickens is better maintained without the excess moisture conditions prevalent in poultry houses utilizing former conventional methods of heating.

Figure 3:
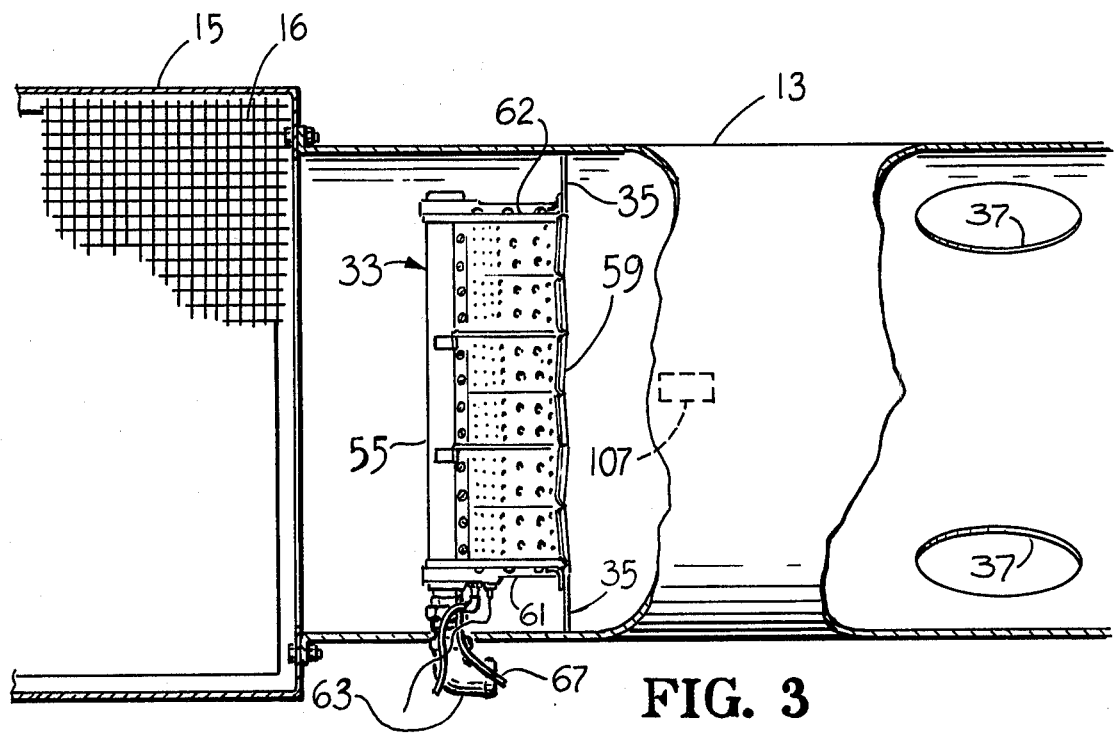
FIG. 3 is a fragmentary horizontal plane sectional view of the end of the heating-ventilating unit of FIG. 1.
Figure 4:
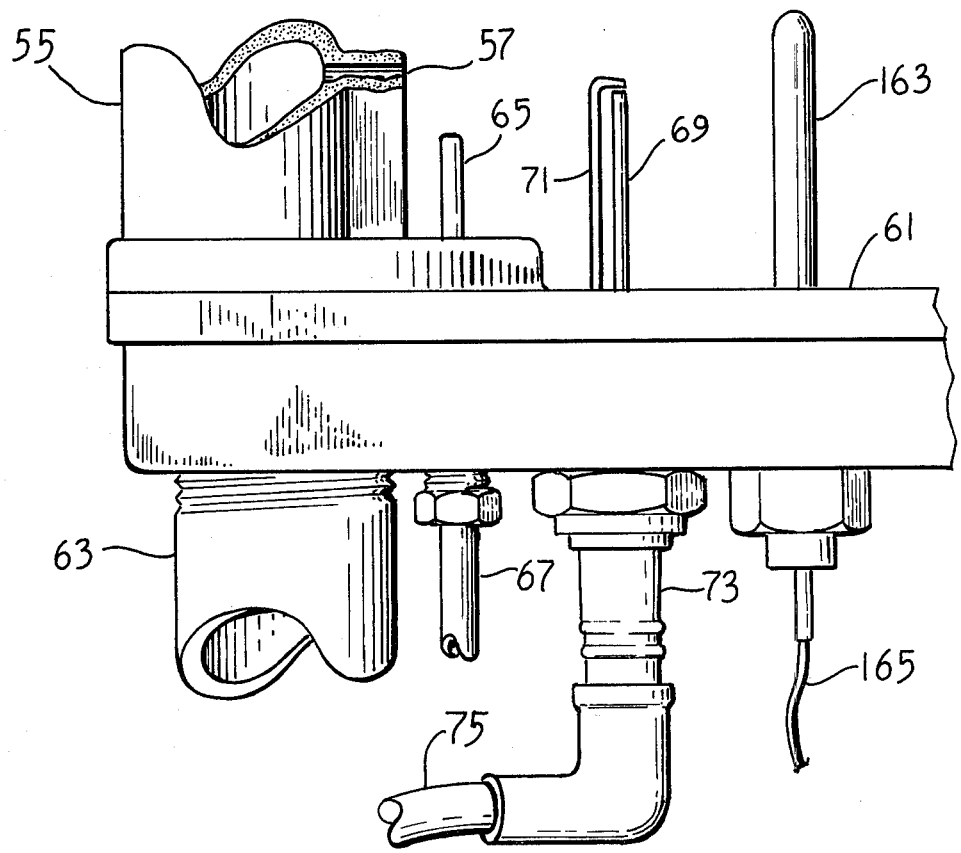
FIG. 4 is an enlarged fragmentary view of a portion of the apparatus of FIG. 3.

FIGS. 3 and 4 show the air heater 33 and duct 13 in more detail. The flow of air through duct 13 is from left to right in FIG. 3. Openings 37 may be covered to any desired degree to adjust their effective opening area and hence control the amount of recirculation produced by fan 21. The larger the effective area of openings 37, the greater recirculation is provided and the less is the velocity of the air from left to right through the duct 13 pass air heater 33. The air passing air heater 33 is drawn from the exterior of the poultry house through weather hood 15 which is provided with a screen 17 to prevent foreign objects being drawn into the duct 13. Heater 33 includes burner 55 having gas jets 57 spaced along its length. Burner 55 is not a Bunsen burner type provided with an air-gas mixer, but is rather arranged so that the high velocity air stream through duct 13 provides the combustion air for the heater 33.

Perforated baffle plates 59 are arranged in a V-shape as best seen in FIG. 1 and are designed to provide efficient combustion over a wide range of fuel injection rates and for the air velocities produced by fan 21. Typically diameters for duct 13 will be 24 inches, 27 inches, or 30 inches for poultry houses up to 250 feet, up to 400 feet, and up to 600 feet, respectively. Air velocity past burner 55 may typically range from 5000 to 15,000 cubic feet per minute. Air heater 33 is a commercially available unit, the details of which do not form a part of the present invention.

The igniter and flame sensor for air heater 33 are shown in enlarged detail in FIG. 4. The ends of the wedge shaped volume between plates 59 are closed by end plates 62 and 61 secured to burner 55. End plate 61 has mounted therein an igniter jet 65 separately connected by tube 67 to the fuel supply as will later be explained. Slightly downstream from jet 65 is a spark plug having electrodes 71 and 69. Somewhat further downstream is a flame sensor 163 which is a fast acting sensitive thermostat operating at approximately 700° F. Under the control of control circuits later to be described, jet 65 is supplied with fuel at the same time that the spark is produced between electrodes 69 and 71. The control circuit also assures that the fan is in operation so that gas from jet 65 is drawn across the spark gap between electrodes 69 and 71 and is ignited. The operation of the fan also causes the flame from jet 65 to pass over flame sensor 163 causing it to operate within a few seconds. The control circuits, as will later be explained, then cause burner 57 to be supplied with fuel which is ignited from jet 65 at which time the spark is no longer supplied to electrodes 69 and 71 and fuel jet 65 is cut off.

FIG. 5 shows the fuel control portion of the system not shown in FIG. 3. Fuel enters the main fuel conduit 201 through a tee fitting 203. Tee 203 also connects to branch fuel conduit 205. Fuel in the main conduit 201 passes through main fuel metering valve 207, main valve 175 and into burner conduit 63. There is also a path for fuel through by-pass conduit 205, second stage fuel metering valve 209, second stage valve 185, and back to the main fuel conduit. Main valve 175 and second stage valve 185 are electrical solenoid valves. A junction box 211 is provided for electrical cables 213, 155, and 173, providing the necessary electrical leads for the various valves as explained in the discussion of FIG. 7 hereinafter. Ignite valve (also a solenoid valve) 159 is connected to receive fuel from the main fuel conduit 201 in advance of main valve 175 and fuel passing through ignite valve 159 is metered by ignition fuel valve 215 before passing to tube 67 and jet 65. Either a natural gas supply or LP gas supply is connected into the control system of FIG. 5 as indicated by the arrow to tee fitting 203.

Figure 6:
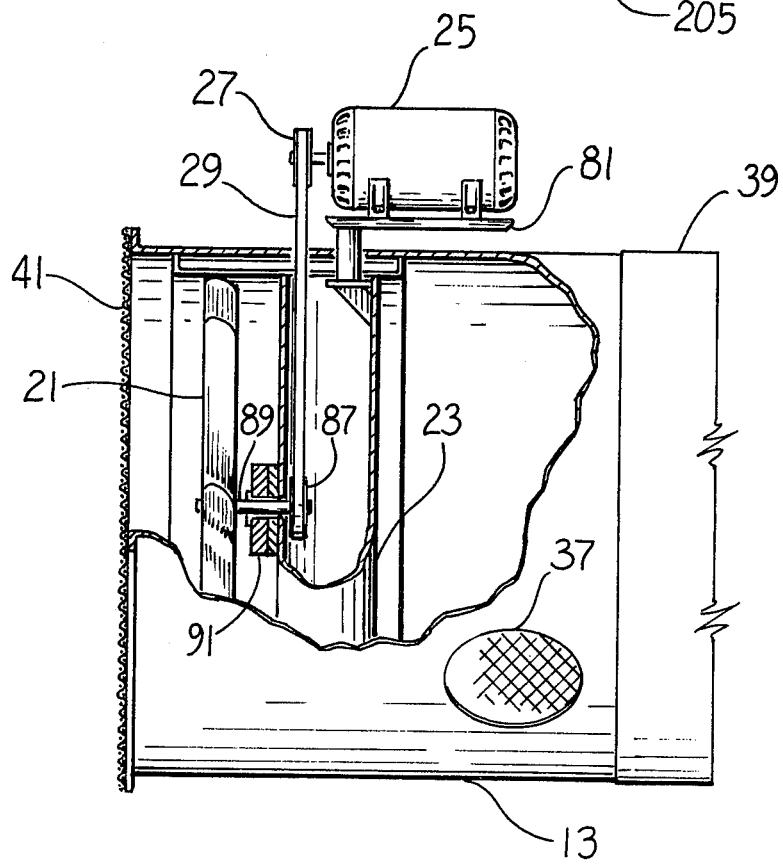
FIG. 6 is a fragmentary elevational view of the interior of the apparatus of FIG. 1 broken away to show the mounting of the fan therein.

FIG. 6 shows in enlarged detail the forward portion of the apparatus. Duct 13 has mounted therein a column 25 which may consist of a section of steel tube welded or otherwise secured in duct 13. Bearing 91 is secured to column 23 and supports shaft 89 of fan 21. A pulley 87 mounted on shaft 89 within column 23 is coupled by belt 29 to pulley 27 of electric motor; a second belt and double pulley may be used if desired; Protective screen 41 protects personnel and birds from injury by fan 21. Motor 25 may be mounted in any suitable fashion on duct 13 as by bracket 81. The specific manner of mounting and driving fan 21 may be as shown or of other conventional form and the present invention is not limited to the illustrated embodiment.

As previously mentioned the system is provided with screened openings 37 to permit recirculation of air in addition to induction of air from the exterior of the poultry house. Openings 37 may be closed in whole or in part by the cylindrical shield 39 which slides to the left in FIG. 6 to close or partially close all openings 37. Moving shield 39 to close openings 37 will reduce the amount of recirculation and somewhat increase the amount of air taken in from the exterior. Increasing the effective area of the openings 37 by reducing the velocity of the intake air will increase the temperature increase of the intake air. This may be desirable when the exterior air is very cold.

Figure 7:
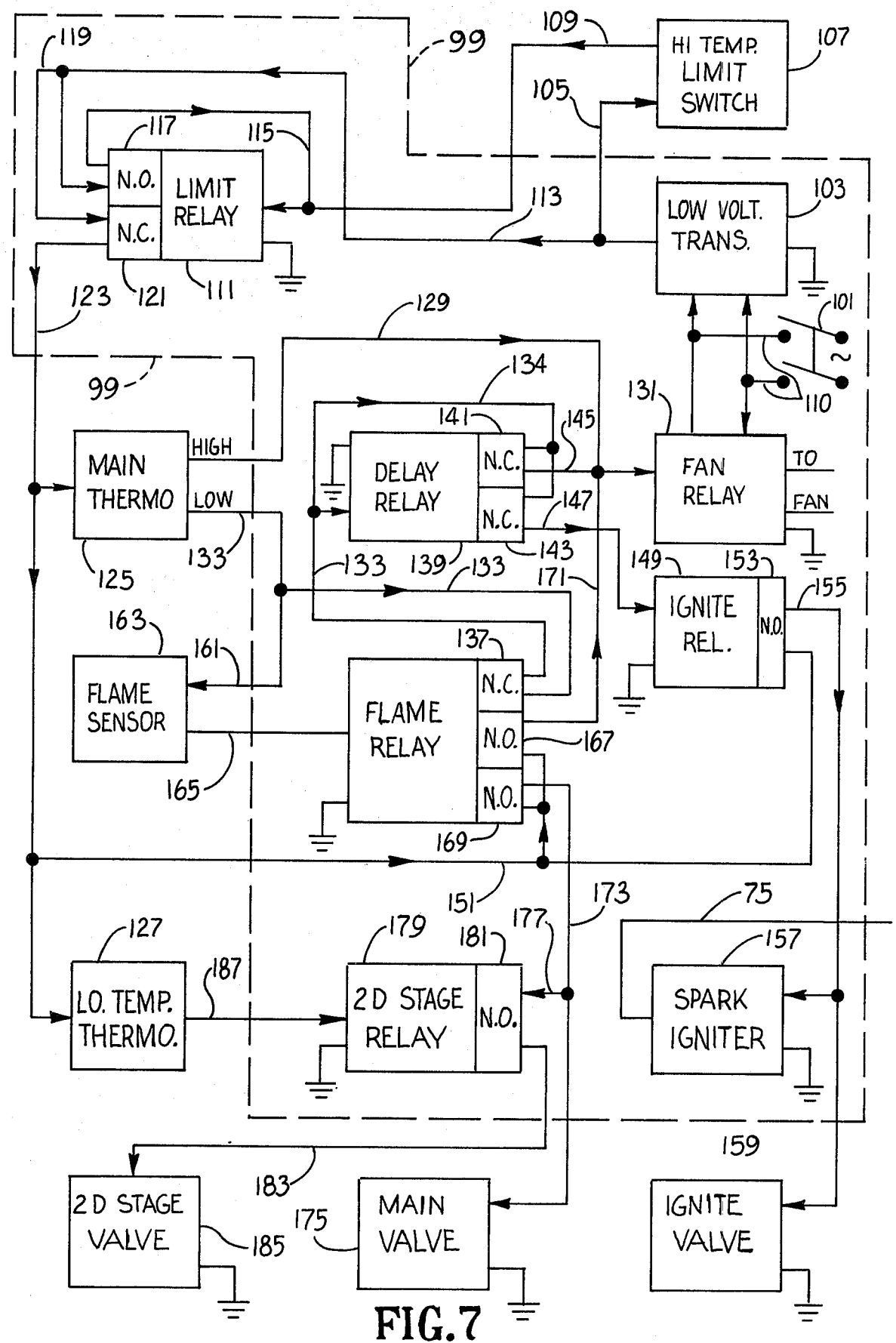
FIG. 7 is a schematic block diagram of the control circuit for the heating-ventilating unit of FIG. 1.

In FIG. 7 the control circuits for the heating and ventilating system are shown schematically. Main switch 101 is connected to the 230 volt electrical power supply (or other than 230 volt depending on requirements of the fan motor). Terminals 110 are connected to the primary of low voltage transformer 103 and also are connected to fan relay 131.

Low voltage transformer 103 provides a low voltage AC signal, of 28 volts for example, for use as a control signal and to operate relays, solenoid valves, etc. A lead 105 connects transformer 103 to a high temperature limit switch 107. This switch will typically be placed in the vicinity of the gas burner and will have contacts which may be adjusted to close at a temperature of about 160° F. In normal operation with a high rate of air flow this temperature will not be reached. However, such temperature will be reached if the fan fails to operate due to a broken or slipping fanbelt or any other reason, thereby causing low air flow, high temperature and closure of the contacts of limit switch 107. Lead 109 connects switch 107 to limit relay 111 which will be caused to operate in response to a high temperature condition. Limit relay 111 has normally closed contacts 121 through which lead 119 connects to main low voltage lead 123. Operation of limit relay 111 thus cuts off the low voltage to lead 123 which disables the system as will later be seen. Equipment damage or a possible fire is thereby prevented should the air velocity drop to a dangerous level.

Lead 113 also connects through normally opened contacts 117 and lead 115 to the input to the coil of limit relay 111. Thus when limit relay 111 is operated it is latched by the signal through lead 115 even though the temperature at limit switch 107 drops and causes limit switch 107 to reopen. Limit relay 111 may be unlatched and the system reset by operating switch 101.

Lead 123 connects to the main thermostat 125 and also a low temperature thermostat 127 (not shown in other figures). Main thermostat 125 is a dual temperature range thermostat with thermostatic switch contacts connecting lead 123 to a lead 129 in the high temperature range and to lead 133 in the low temperature range. By way of example the high temperature range may be above 83° F. and the low temperature range may be below 80° F. Preferably thermostat 125 is adjustable so each of these temperature ranges may be adjusted independently. It should be noted that a range from 80°-83° is provided where no heat or forced circulation is provided. (With the foregoing ranges for rising temperature, the ranges for falling temperature might be above 80° and below 77° due to normal lag of thermostatic switches.)

High temperature lead 129 connects to the coil input of fan relay 131 so that the system fan will operate whenever the main thermostat senses a temperature in the high temperature range. Relay 131 may be a d.p.s.t. relay for connecting 230 V. power to the fan motor.

Main thermostat 125 low temperature lead 133 connects through normally closed contacts 137 of flame relay 135 to the coil input of delay relay 139 and also through lead 134 and normally closed contacts 141 and 143 of delay relay 139 to leads 145 and 147 which connect respectively to fan relay 131 and ignite relay 149.

When the low temperature contacts of the main thermostat 125 close a signal from lead 123 is transmitted through main thermostat 125, contacts 137, contacts 141 and 143, and leads 145 and 147 to operate fan relay 131 and ignite relay 149. Ignite relay 149 operates spark igniter 157 and ignite valve 159 with power conducted through lead 151, contacts 153 and lead 155.

In the event that ignition is not achieved delay relay 139 will operate in about 90 seconds causing contacts 141 and 143 to open and causing the release of fan relay 131 and ignite relay 149. Delay relay 139 will remain operated and the system will be shut down until the faulty ignition system can be corrected, at which time the system will be reset upon operation of switch 101.

If igniter jet ignition is achieved in normal fashion in less than three seconds flame sensor 163 will operate in 20 to 30 seconds to close contacts connecting the low temperature signal through lead 161 and lead 165 to operate a flame relay 135. Contacts 157 and 169 will close, transmitting a signal from lead 151 through leads 171 and 173 to operate the fan relay 131 and main valve 175. Burner 55 will ignite from jet 65.

Operation of flame relay 135 causes contact 137 to open disabling delay relay 139 and disconnecting the signal to leads 145 and 147 which previously operated the fan relay 131 and ignite relay 149. Operation of fan relay 131 has been taken up by the signal through contacts 167 and lead 171 but spark igniter 157 and ignite valve 159 are disabled. Ignite relay 149 may have a delayed release to assure burner ignition before jet 65 cuts off.

Main valve 175 will be maintained open causing the main burner to operate at the first stage level so long as the main thermostat 125 produces a low temperature signal (and limit switch 107 does not close).

Low temperature thermostat 127 (not shown in other figures) may be located in the poultry house out of the airstream from the heating and ventilating unit and may be set to a temperature somewhat lower than the main thermostat such as 73° F., for example. When the interior temperature drops below this setting, low temperature thermostat 127 will provide a signal on lead 187 to second stage relay 179. Contact 181 will close so that the signal provided to main valve 175 is also provided over lead 177 and 183 to open second stage valve 185. Second stage valve 185 then provides additional fuel for the burner until the temperature in the poultry house rises and the contacts of low temperature thermostat 127 open. It may be noted that in any case second stage valve 185 only receives a signal causing it to open if main valve 175 is being operated by a signal on lead 173.

As an alternative arrangement low temperature thermostat 127 may be located to respond to outside temperature and be set at a temperature of about 20° or 30° F. This arrangement would cause the second stage valve 185 to operate together with the main valve 175 whenever the outside temperature was below the setting of low temperature thermostat 127 without the necessity for the temperature within the poultry house dropping lower than the low temperature setting of main thermostat 125. The second stage control may be omitted in climatic zones where it is unneeded, or one could alternatively provide a third stage as well as the second stage if desired for severely cold climates.

While a single high temperature limit switch 107 is shown, it will be understood that two or more of such switches connected in parallel may be used. One such switch may be upstream of the burner and another downstream of the burner so that one or the other will surely operate in the event of fan failure.

The system of FIG. 7 is described as an electromechanical relay control system, but it will be understood that equivalent solid state devices or circuits may be substituted for some or all of the relay devices in a manner well known in the electrical art. Appropriate fuses or circuit breakers will be provided for the system, but are omitted from FIG. 7 for simplicity.

It will be understood that the components shown by way of illustration may generally be replaced by equivalent components performing the same function. For example other forms of fans or blowers could be used, but it is desirable that they have a capability of moving at least about 5,000 cubic feet per minute of air with low electric energy usage. Also the air heater of preferred form may be placed with a different form of heater, but it should be capable of efficiently burning about 100 cubic feet per hour of natural gas or an equivalent amount of other fuel to provide heat of at least 100,000 BTU per hour. The open flame burner illustrated converts over 90 percent of the fuel energy to heat and increases air temperature up to 85° F. Increase of air temperature will seldom reach 85°, however. The unit is normally adjusted with fuel and air flows so the air discharge from the fan is at or below the desired house temperature.

As previously mentioned the placement of the heater-ventilator unit at one end of the poultry house is found to be very satisfactory, but the unit could be placed in the center of the poultry house to direct the air flow toward the ends of the house. Also two units with separate or common control could be used in one poultry house and located together.

The system is shown applied to a conventional chicken house as found in the poultry producing region of Arkansas and surrounding states. The principles involved are applicable also to turkey houses and generally to houses for large numbers of warm blooded domestic animals. It should also be understood that automatic feeders and automatic watering equipment, together with temperature alarms and other equipment desirable for poultry house operation will be employed in conjunction with the heating-ventilating system of the present invention; such features are omitted from the illustrations for simplicity and clarity.

In addition to the variations and modifications described or suggested above, numerous other variations and modifications to the invention will be apparent to those skilled in the art and accordingly the invention is not be be construed to be limited to the embodiment described in those variations and modifications shown or suggested, but is rather to be determined by reference to the appended claims.

What is claimed is:

1. A heating-ventilating system for a poultry house comprising
an air duct having an air intake and an exhaust opening,
a fan mounted therein, a fuel burner mounted in said duct, a starter fuel jet and an electric igniter therefor, a first temperature sensor adapted to be placed in said poultry house out of the direct air flow from said fan, means for controlling said starter fuel jet and electric igniter to operate only in response to a low temperature condition of said first temperature sensor, means for controlling said fan to operate in response to said first temperature sensor, a flame sensor in proximity to said starter fuel jet, and a valve for said fuel burner and control means for opening said valve responsive to said flame sensor.

2. Apparatus as recited in claim 1 further including a second temperature sensor in said duct in proximity to said fuel burner and control means for disabling said fuel burner in response to a high temperature signal therefrom.

3. Apparatus as recited in claim 1 or 2 further including means for supplying additional fuel to said burner in response to a lower temperature control signal.

4. Apparatus as recited in claim 1 or 2 further including an adjustable opening in said duct between said fan and said burner.

5. A heating-ventilating system for a poultry house comprising an air duct, a fan mounted therein, a fuel burner mounted in said duct upstream from said fan, means for directing the air flow at a controlled velocity and direction past said burner, a starter fuel jet and an electric igniter therefor, a first temperature sensor producing first and second signals for first and second temperature ranges adapted to be placed in said poultry house out of the direct air flow from said fan, means for controlling said fan to operate in response to either said first or second signal, means for controlling said starter fuel jet and electric igniter to operate in response to said first signal only, a flame sensor in proximity to said starter fuel jet, a valve for said fuel burner and control means for opening said valve responsive to said flame sensor, means for supplying additional fuel to said burner in response to a temperature control signal, a second temperature sensor in said duct and control means for disabling said fan and fuel burner in response to a high temperature signal therefrom.

6. Apparatus as recited in claim 5 wherein said first and second temperature ranges are not contiguous thus providing an intermediate temperature range in which said fan and said starter fuel jet and electric igniter are all inoperative.

7. Apparatus as recited in claim 1 further including means for controlling said fan to operate in a poultry house temperature range higher than said low temperature condition.

8. Apparatus as recited in claim 7 wherein said high temperature range is spaced above said low temperature condition providing an intermediate temperature range therebetween in which said fan, as well as said starter fuel jet, is inoperative.

* * * * *